(12) United States Patent
Koivusalo

(10) Patent No.: US 9,087,407 B2
(45) Date of Patent: Jul. 21, 2015

(54) METHOD OF DISPLAYING READABLE INFORMATION ON A DIGITAL DISPLAY

(75) Inventor: Esko Koivusalo, Haabneeme Alevik (EE)

(73) Assignee: ICERGO OY, Helsinki (FI)

(*) Notice: Subject to any disclaimer, the term of this patent is extended or adjusted under 35 U.S.C. 154(b) by 218 days.

(21) Appl. No.: 13/885,598

(22) PCT Filed: Nov. 17, 2011

(86) PCT No.: PCT/FI2011/051012
§ 371 (c)(1),
(2), (4) Date: May 15, 2013

(87) PCT Pub. No.: WO2012/066190
PCT Pub. Date: May 24, 2012

(65) Prior Publication Data
US 2013/0222378 A1    Aug. 29, 2013

(30) Foreign Application Priority Data

Nov. 17, 2010 (FI) .................................. 20100380

(51) Int. Cl.
*G09B 17/00*  (2006.01)
*G06T 13/20*  (2011.01)
*G06F 17/21*  (2006.01)
*G06T 13/00*  (2011.01)
*G06T 19/00*  (2011.01)

(52) U.S. Cl.
CPC .............. *G06T 13/20* (2013.01); *G06F 17/211* (2013.01); *G06T 13/00* (2013.01); *G06T 19/00* (2013.01); *G09B 17/003* (2013.01)

(58) Field of Classification Search
CPC ........ G06F 17/211; G06T 13/00; G06T 13/20; G06T 19/00; G09B 17/003
See application file for complete search history.

(56) References Cited

U.S. PATENT DOCUMENTS

| 6,515,690 | B1 | 2/2003 | Back |
| 2002/0091713 | A1 | 7/2002 | Walker |
| 2007/0061720 | A1 | 3/2007 | Kriger |
| 2010/0013859 | A1* | 1/2010 | Robertson ................. 345/646 |
| 2013/0106674 | A1* | 5/2013 | Wheeler et al. .............. 345/8 |

FOREIGN PATENT DOCUMENTS

WO    9408325 A1    4/1994

OTHER PUBLICATIONS

Wong, YY "Temporal typography: characterization of time-varying typographic forms". Master's thesis, MIT, Oct. 26, 1995 [online] [retrieved on Jul. 21, 2011] Retrieved from the Internet: <URL:http://dspace.mit.edu/bitstream/handle/1721.1/29102/34312115.pdf> p. 36, paragraph 2; p. 38, paragraph 2 - p. 41, paragraph 1; Figures 35-37.

PCT International Search Report, PCT/FI2011/051012, mailed Jun. 5, 2012.

* cited by examiner

*Primary Examiner* — Kee M Tung
*Assistant Examiner* — Ryan M Gray
(74) *Attorney, Agent, or Firm* — Ziegler IP Law Group LLC

(57) ABSTRACT

A method, a program, by which an animated expression of three-dimensional information space is created bringing forth a reading architecture on digital screens in which the presented readable information appears three-dimensionally and dynamically to the reader's field of vision.

11 Claims, 5 Drawing Sheets

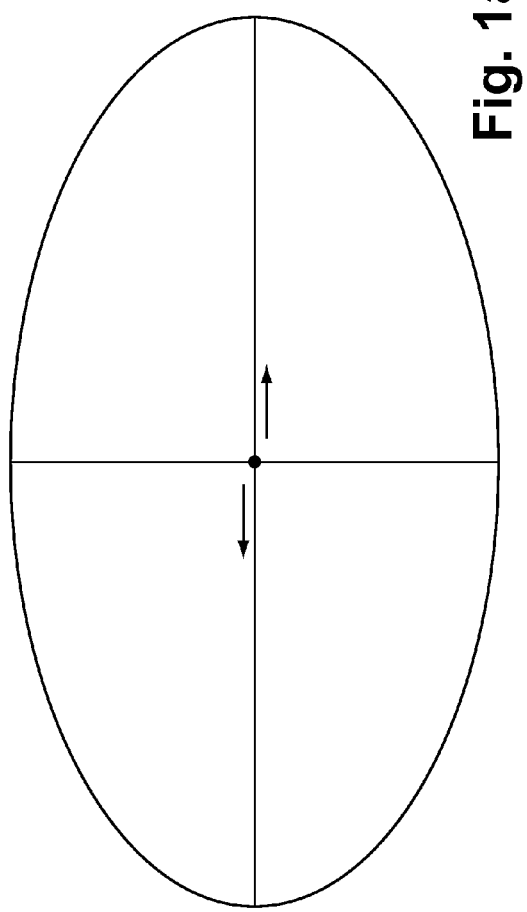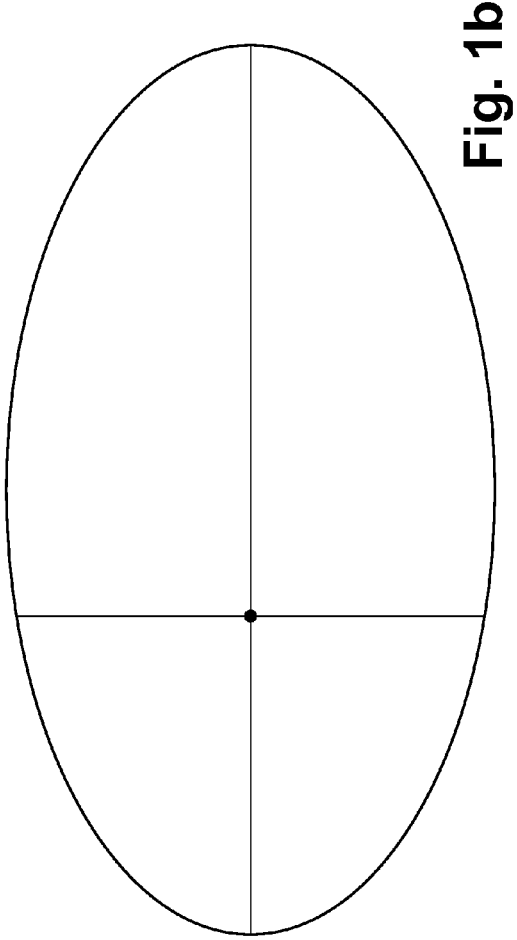

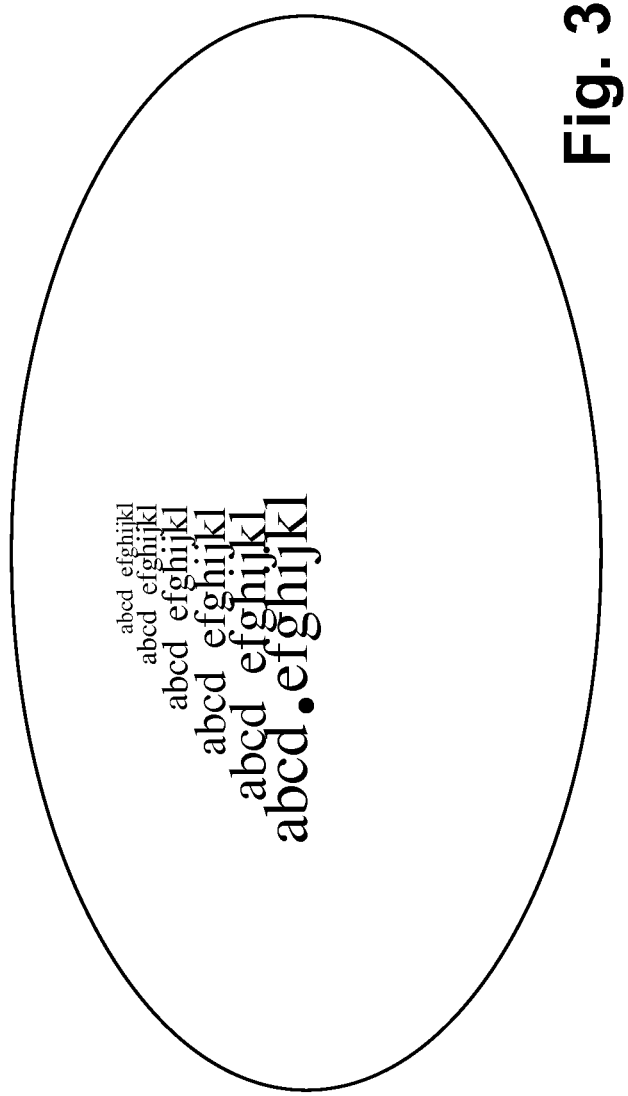

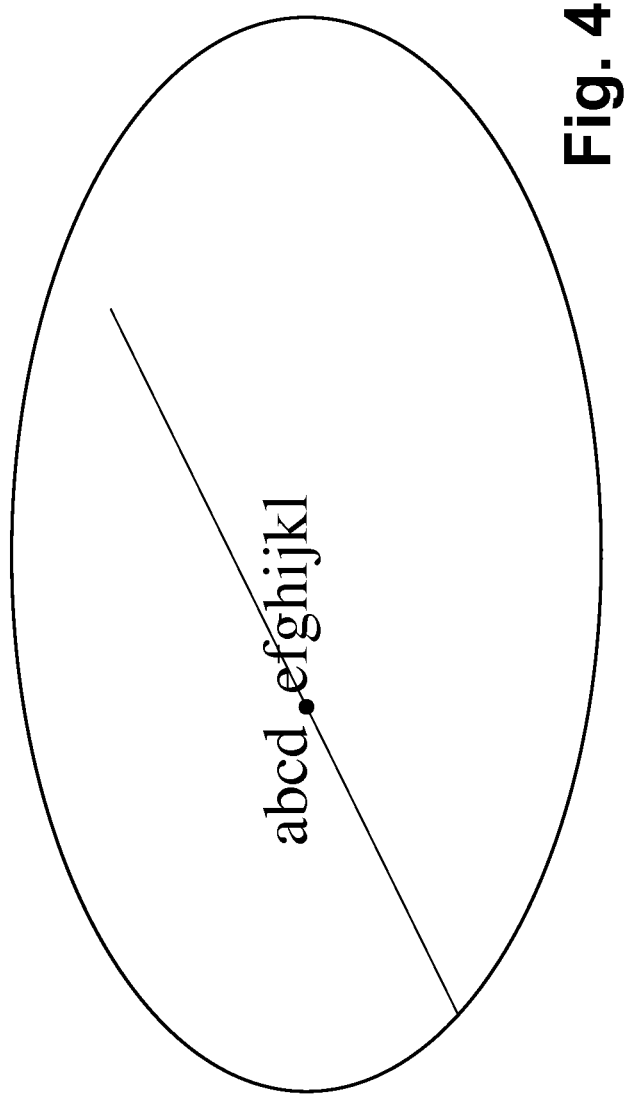

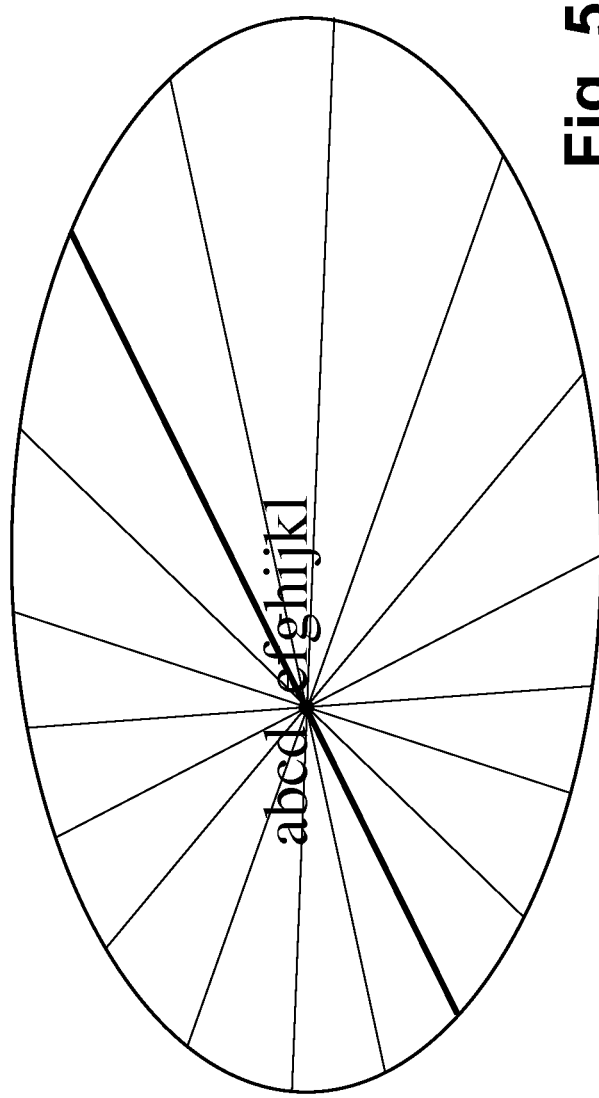

METHOD OF DISPLAYING READABLE INFORMATION ON A DIGITAL DISPLAY

Figure 2:
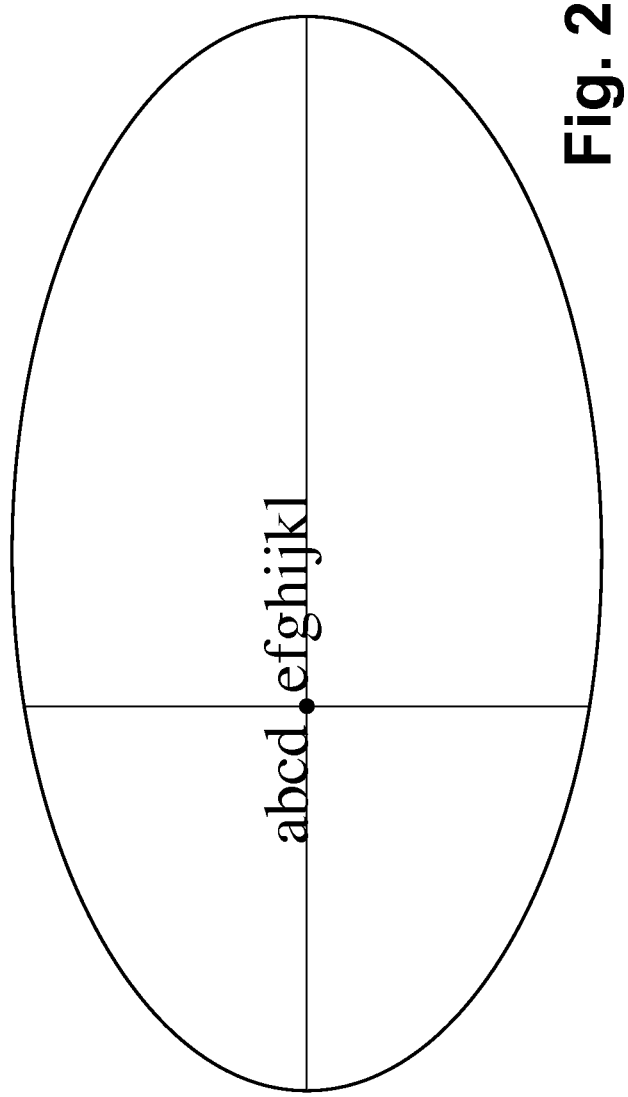

The object of this invention is a method for displaying readable information on a digital display.

1. D3D Reading Architecture—Purpose of the Method

The method supplements and/or replaces the static two-dimensional reading architecture based on modern alphabetical reading and writing skills. The method creates new letters, i.e. an alphabet, signs, and symbols, used in a three-dimensional dynamic architecture.

2. Solutions Used Before

The modern alphabet was created c. 3500 years ago. The Egyptian hieroglyphs are the oldest writing system in the world, c. 5000 years old. The cuneiform writing of Iraq is nearly as old. Chinese character writing is the oldest writing system still in use, it utilises c. 3000 commonly used signs. German-born Johannes Gutenberg invented printing in 1436, which has had the most significant effect on duplicating the modern alphabet and making information available to everyone. By the year 2010 almost no development has occurred in the field of reading architecture. However, two steps of development can be mentioned; one is the transition to digital publication and publishing activities, and the other is RSVP (Rapid Serial Visual Presentation, AceReader and Stepware Inc.). In spite of the aforementioned, reading architecture remains static, for instance, in electronic reading devices and in software on the market such as in the Microsoft Reader programme, in iPad (Apple), PlayBook (RIM), and Calaxy Tab (Samsung).

3. Shortcomings in the Current Systems

In the old static, alphabetical method of displaying information, the readers have to move their eyes several times on a line of text due to the narrowness of the eye in the area of precise sight; in western languages from left to right, in Arabic from right to left, and from top to bottom in the languages of South-East Asia. Text in this format only allows readers to utilise the area of precise sight and rod cells to figure out stationary objects two-dimensionally (This is the basis for the definition I use: "static two-dimensional reading architecture"). Reading does not actually occur when a reader changes the direction of sight and a good portion of the generally understood and defined reading time is used to change the direction of sight and, in a way, to search the text to perceive precisely what it entails. The reading process is extremely slow and contrary to the natural structure of the eye and the capacity to understand a multi-dimensional information space in which the objects to be perceived move into the reader's field of vision on his/her own terms. The capacity of the eye to perceive moving objects is not utilised at all in static reading architecture. In addition, the reader only has to read on the terms of the producer of the readable information; the fonts, grouping, layout, etc. cannot be altered by the reader, although in modern electronic reading devices and books the reader can choose, for instance, the font, size, and backlight, the architecture is still static. A broader definition of reading: Reading is the dynamic understanding of the multi-dimensional information space and of the moving and immovable objects therein. The objects include letters, signs, numbers, symbols, words, sentences, pictures, people and various other objects. Reading also involves the perception and interpretation of different situations and events in the information space. Reading is also the searching, adopting, and remembering of information.

The present reading architecture is one of the obstacles in the way of controlling the information explosion. In the 1970s, the concept of information flood was taken into use; in the 1980s it was the information revolution, and at the turn of the millennium the term information explosion was taken into use. More and more, readable information is in a digital form, but still within the architecture of static reading. The amount of readable information in digital form doubles every one and a half years, but the time used for reading cannot be increased in proportion to this.

Reading is connected to nearly all human activity. More than 90% of all human knowledge is in readable format, presented statically and thus contrary to the natural perception capability of the eye. The reading result of an average reader does not correspond to the demands of today if compared with the reader's own constant learning, profession and work. The average reading speed varies between different languages due to e.g. the structure of the language and the length of words. In Finnish it is nearly the same as the normal rate of speech, c. 150-200 words per minute, while for instance in English the same figure is c. 300. The amount of new readable information is already so vast that the architecture of static reading is a great obstacle from the point of view of the reader, the receiver of information, as regards the ever-increasingly demanding and heightening amount of learning, the adoption of strongly growing new information, and to some extent the control of life itself. As the amount of reading increases, the working time used for reading cannot be increased a lot. For instance office clerks use as much as 1-3 hours of their working time per day for reading, depending on their job and duties. Going to school and studying still involve reading for the most part. Each job and profession has so much new information and current news to deal with that reading it all can be a great, even unsolvable, problem. Moreover, with static reading architecture, the reading outcome cannot be greatly improved with so-called fast reading courses and methods, because the restrictions evident in the expansion of the field of vision, the shortening of the fixation time and the increasing of eye movement speed are soon met. At most, nearly double the actual reading speed can be reached, despite what those marketing quick reading courses say.

RSVP is a primitive step towards the architecture of D3D reading, but it is still two-dimensional and the fonts have not been developed at all for multi-dimensional reading. The reader has to keep his/her eyes fixed to one point on the display (fixation point and the area of precise vision). Text is fed into the field of observation at great speed, the width of the text corresponding to the reader's maximum area of precise vision. The method has no impression of depth not to mention a three-dimensional aspect, which means that most of the abovementioned parameters are left out together with, for instance, the eye's ability to trace objects multi-dimensionally. RSVP has not solved the problem of presenting alphabetical information, which is evident especially on small displays (mobile phones and electronic books and reading devices), although its advocates claim so. In digital displays readability has improved due to the higher resolution of the devices, display adapters and the size of processor memories, but the text fed by RSVP is heavy and tiring to read. The applications chiefly involve displaying short catchphrases "for fun", but a commercial and global application with RSVP has not been created (e.g. in displaying SMS messages on mobile phones), nor will one be created. The static 2D reading architecture is also a significant problem for producers of readable information, such as the press, publishing and publication activities, etc. All of them have to compete for the time used by readers for reading. This is a fixed amount of time, which everyone uses or invests into reading, alongside other activities, in order to control their life. The lifespan of readable information is constantly becoming shorter. This is true for the news and for scientific and specialised information. Scientific research and research and development in all fields produces more and more new readable information. Still there is no more time available to read than before. Very many of us feel that reading a lot in the 2D static architecture is a stress factor, which is evident in the eyes becoming tired, headaches, sleeplessness and even in deteriorating eyesight. In short, 2D static reading architecture is an unnatural, inefficient and even distorting method for producing readable information to receivers.

The purpose of this invention is to remove the abovementioned defects known as such. The method according to the invention is characterized in that it creates an impression, through programming and animation, in which readable information is presented three-dimensionally and dynamically on a display.

The various embodiments of the invention are presented in the dependent claims in the claims section.

4. Basic Idea of the Invention

A method by which a virtual animated D3D reading architecture is shown on digital information displays. It enables the showing readable information in a three-dimensional and dynamic manner such that the readable information is brought to the readers range of vision on his/her own terms and according to the reader's profile. The reader profile is based on the personal capacity of the reader to perceive three-dimensional information space. This includes parameters, the values of which vary greatly between different people. They include, among others, the left-right dominance of the eye and also skills which can be developed using special training programmes (not characteristics, since characteristics cannot be developed), including the extent, precision and speed of the perception of depth, the precision and speed of perception horizontally and vertically, the extent of the field of vision horizontally and vertically and the speed of eye movements. Before taking the method into use, the reader performs the programme adjustments based on the abovementioned parameters. The method also includes the letter types associated with multi-dimensional reading (letters, signs and symbols) such that each object to be perceived while reading (may be a word focused simultaneously using one fixation, several words or a sentence) is formed of letters, signs and symbols entangled inside each other in depth as well in such a way that the reader perceives them without looking elsewhere. In this way for instance the word "football" moves into the reader's field of vision such that the letter "f" "comes" closest to him/her and then "oo", "t", "b", "a", and finally "ll", which, due to the three-dimensional virtual architecture, appears as the smallest and as the last of the row of letters focused in depth. The word is perceived in depth as one entity or "sign" where the letters are merged into each other such that they can also be perceived separately. A series of pictures illustrating this is enclosed.

Simply speaking, the method can be compared to driving a car, in which case the reader, or driver, focuses his/her sight onto the centre of the road. As the car moves the driver perceives information coming simultaneously to him/her from the left and right and acts accordingly. (S)he adjusts the speed exactly according to the road conditions and other traffic. Information constantly enters his/her field of vision leading to observations and reactions. The information is embodied in words (e.g. directions, road signs and to some extent traffic signs), numbers (e.g. distances and speed limits), pictures (advertisements), etc. Part of the information moves and part of it is stationary in the information surroundings and moves into the driver's field of vision at the speed driven. Part of the information is very important from the point of view of getting ahead, for instance the next intersection where a right-hand turn must be made. Part of the information is less important, such as a text on a roadside advertisement telling to go to the next service station. The same is true for three-dimensional dynamic reading. The readable (perceived) information coming at the reader slides into the field of vision, some of which calls for slowing down or even for stopping or going backwards. Some of the information met is sometimes so familiar that it can be passed by quickly.

The method is realized in digital displays, which include, for instance, mobile phones, television sets, monitors, information displays, traffic signs, and large road-side signs. The method is a programme by which readable information can be produced into a three-dimensional and dynamic reading architecture in an animated way. The method is also a programme, which controls and manages the displaying of information in three-dimensional reading architecture and acts as a platform for displaying all types of information in digital format. The reading process is guided using the control buttons of each device, with a joystick or with other similar accessories.

The method is based on the natural ability of a reader to perceive multi-dimensional and dynamic information space. In addition to the area of exact vision of the eye, it also utilises the ability of the eye to trace moving objects.

The method is also a programme, which converts readable information in digital format in static architecture into an animated three-dimensional dynamic architecture. In the method a programme converts text-based data produced with word-processing programmes into three-dimensional dynamic architecture. The D3D dynamic reading architecture develops later into a reading architecture, which is both interactive and audible and applies, among others, information technology, nanotechnology and neurophysiology, as well as research on eye movements and brain research in general.

5. Advantages of the Solution According to the Method

The method significantly increases the pace of reading, making it more pleasant and efficient than reading with static architecture. The method enables a high reading outcome, which improves all human activity connected with reading.

From the viewpoint of neurophysiology and brain activity, the method creates a holistic reading process in which both the right and left cerebral hemispheres are activated simultaneously leading to more intensified learning and problem solving than reading with static architecture. The reading process is both creative and logic at the same time, which adds to and deepens activity in the corpus callosum, connecting the left and right cerebral hemispheres. The fact that the reader adjusts the parameters of the programme to suit his/her reader profile alone makes it possible to activate both cerebral hemispheres more evenly during the reading process. From the perspective of all human activity, it is extremely important that both cerebral hemispheres work in balance and simultaneously for the most part, whether the activity involves problem solving, gymnastics, or learning a foreign language, for instance. According to many brain scientists the prevailing static architecture of reading is not based on a balanced functioning of the right and left cerebral hemispheres and thus has an adverse effect on the functioning of the human mind The same was said and proven correct by the British-born Tony Buzan, who in the 1970s created a completely new and revolutionary writing and learning method called Mind Map. The invention will utilise and later adapt the Buzan method, but initialising it is an enormous project that calls for hundreds of graphic designers, programmers, and also some specialists in neurophysiology, neuropsychology and brain research.

In the near future, the method will markedly reduce the proportion of printed or printed-type (for instance the Microsoft slogan for Microsoft Reader: "It's like printed format") information for instance in the media, printing and publishing, education and teaching, and in information production and distribution in general.

The one extremely significant advantage is the manifold increase in the reading outcome compared to the architecture of static reading. Reading outcome indicates how much information a reader reads per unit of time and how (s)he comprehends, remembers, and understands what is read. Since the reading process is natural and based on the reader's personal adjustments and the ability of the eyes to perceive things multi-dimensionally and dynamically, the reader can read large amounts of information continuously and nearly without tiring.

The method markedly reduces the costs of printing and publishing, communications and education and teaching, because traditional printing costs do not exist.

The method makes it possible to produce and distribute to readers a larger amount of information, because, thanks to the heightened reading outcome, readers can receive and read a markedly larger amount of information compared to the traditional publishing and distribution methods.

6. Technical Description

Creation of a Platform for Presenting Dynamic Three-Dimensional Animated Information First a platform is created for presenting D3D information, in which platform the readable information is presented to the reader according to his/her personal parameters. The technical description presents information for creating a platform on a computer display, although the platform may also be used in a mobile phone, on a TV screen, digital billboards and on other similar displays in which digitally, and sometimes printed (e.g. advertisements and newspaper ads), readable information can be presented with consideration to the demands of the reader's optical ergonomics.

FIG. 1. Dominance

The display shows a figure shaped like an oval with a line going through it both vertically and horizontally. The intersection of the lines is the point by which the reader determines the so-called dominance of the eye. If the reader's right eye is dominant, the point in question settles somewhat on the left side (FIG. 1a) in the horizontal direction, and correspondingly if the left eye is dominant, the point settles somewhat more to the right in the horizontal direction (FIG. 1b). This point is the so-called fixation point of eyesight on which the reader focuses while reading.

FIG. 2. Horizontal Extent of the Field of Vision

The assumption in all of the following explanations is that the reader's right eye is dominant as with 70% of all readers. The horizontal extent of the field of vision is the amount of characters the reader can perceive around the fixation point on one row. Depending on the font size the reader can perceive around 12 characters during one fixation.

The reader focuses sight onto the fixation point and letters appear on its left and right sides in the same relation as what the dominance is. The text appearing in the D3D reading window is distributed horizontally according to this determination or adjustment.

FIG. 3. Preciseness of Perception in the Direction of Depth, Dynamic Depth Vision.

The range in depth of the text appearing in the D3D reading window is adjusted to optimally suit the reader. Dynamic depth vision can be compared to the perception of objects moving, passing and coming towards a person in traffic, such objects in reading according to the invention being the amount of lines of letters and signs appearing simultaneously for perception in the D3D reading window. Each line of the letters and signs being perceived is distributed to the left and right sides of the fixation point in the same way as a row of letters and signs closest to the reader.

The size and length of lines between the letters and signs appearing simultaneously one after another, together with the spaces between them, change symmetrically.

FIG. 4. Strengthening the Impression of Depth

To create a stronger impression of depth based on the abovementioned adjustments of the reader, the impression of three-dimensionality is linked to the D3D reading window by adding a "centre line" to go through the fixation point, which centre line divides the consecutive lines of signs and letters.

FIG. 5. Further Strengthening of the Impression of Depth.

The three-dimensionality and impression of depth are further strengthened by "vectoring" the D3D reading window with thin lines, the mutual density and relationship of which are determined by both dominance and perception in the direction of depth. The centre line is thicker, which distinguishes it from the vector.

Changing Adjustments and Parameters During Reading

The reader can adjust the backlight in the D3D reading window to make it dimmer or brighter, change the colour of the background, the size and colour of the letters as well as how quickly the lines appear.

If needed, the reader can also stop the text being read, or enlarge some point of the text, for example a separate word. The text can also be rewound at a chosen speed.

The reader can also add to the impression of depth by increasing the amount of rows of letters or signs being perceived simultaneously, or reduce the impression of depth by removing one or more rows of letters or signs appearing simultaneously. All of these changes are performed according to the special characteristics and demands of each device; on a computer with the mouse and/or keys, on a mobile phone with buttons or by touching the objects on a touch screen, and with a remote control on a TV set.

On a computer display the reader can also adjust the size of the D3D reading window, while in a mobile phone the size of the D3D reading window is standard according to the make in question. On a computer display the D3D reading window can be c. 5.5 cm×4.0 cm at its smallest or the size of the entire display at the largest. On a TV screen the D3D reading window can be c. 5.5 cm×4.0 cm at the smallest and the size of the entire TV screen at the largest. The reader can also freely alter the shape of the window, in which case the D3D reading architecture and the information in it is changed correspondingly in such a way that the reader's personal adjustments remain the same.

The adjustments of controlled, non-interactive D3D displays can be altered using remote control, for instance. This means that the font size, impression of depth, etc. of large advertisement boards on roadsides and streets, in shop windows, etc. can be altered according to the time of the day, traffic density, etc. Correspondingly, a message being on a D3D billboard can also be emphasised by stopping it, by rewinding, or by enlarging an individual word, sign, logo, etc.

D3D boards used in large public events can be adjusted ergonomically from the point of view of visibility such that the readable information on them appears at an angle and symmetry most suitable for the entire audience. In this way one giant screen can communicate information simultaneously to a very large amount of readers in situations where before many separate screens had to be placed in different locations.

D3D Programme Adjusts the Arrangement of Advertisement Texts, etc. into a 2D Environment Although D3D reading is not carried out in a 2D environment, the programme according to the invention can be used to produce readable information (mainly words and sentences) in printed media, for instance (incl. traditional roadside advertisements or street or shop window ads), and especially for advertisements such that a static impression of depth is created, although this does not create dynamic depth vision and the like. The core message of the advertisement is at a point to which the viewer's attention is mainly attracted. It can be a prompt, a command or a slogan with only a few words at the most to enable the reader to detect it with one fixation. The fixation point can be an estimated and measured general central point, somewhat like a stopped D3D reading window. The advantage of this compared to earlier solutions is that the verbal part of the printed ad only takes up a small section of the display, leaving more room for the illustrated part, the actual message.

D3D Programme Adjusts the Basic Message in Printed Learning Material

As above, the programme can be used to illustrate the basic points of printed learning material using the D3D reading window. The central point of the topic in a few sentences or words is added to the edges or middle part of a page of a textbook, lecture hand-out, etc. It can be prompt, a command or slogan, which crystallizes the most essential facts relating to what is being taught and which the learner can perceive with one fixation. The fixation point can also in this case be an estimated, measured general central point, somewhat like a stopped D3D reading window.

D3D Controls Milieu Planning, Building Planning, Interior Decorating and Architecture in General The method according to the invention supports the planning and construction of places where people move about when working and during leisure, taking into account above all the depth of vision. The relation between objects possibly moving (e.g. traffic) and/or staying in one place within the spaces and the people being and/or moving there can be determined better, safer, more economically and even in a more social manner using the method. For instance, when city milieus are planned, an imagined human figure is first attached to the 3D model being created, and this figure perceives the environment in an average way based on the parameters according to the invention. The programme gives suggestions for placing the objects and/or for arranging their movements, the goal being to create a most optically ergonomic milieu.

Skill Games Which Improve Perception

Games that improve perception and especially dynamic depth vision can be produced onto a D3D platform according to the invention. Both the game platform and the objects used in the game—"chips, balls or pieces which are picked up"—are adapted personally right from the beginning of the game according to the parameters in question. Such games include, for instance, those based on the speed and precision of perception in depth and horizontally, which also develop the reader's reading in a traditional 2D environment and markedly improve the reading outcome, learning and problem solving. The games differ from the partly therapeutic ortoptic exercises, which have been used for a long time by opticians, in that they are realized three-dimensionally on a D3D platform according to the invention.

The invention claimed is:

1. A method of presenting a word on a display of a device, comprising:
   converting a text-based data word into a three-dimensional word object;
   moving the three-dimensional word object into a field of view of the display;
   positioning the three-dimensional word object relative to a eyesight fixation point on the display;
   distributing letters of the three-dimensional word object on a left and a right side of the eyesight fixation point, the eyesight fixation point corresponding to a pre-determined eye dominance;
   increasing a size of the letters of the three-dimensional object as it is moved into a forefront of the field of view of the display;
   moving the three-dimensional word object along a horizontal line when a maximum size of the letters is reached; and
   decreasing the size of the letters of the three-dimensional word object as the object moves along the horizontal line and out of the field of view.

2. The method of claim 1, comprising adjusting a speed of movement of the three-dimensional word on the display.

3. The method of claim 1, comprising moving a number of three-dimensional words consecutively into the field of view, one word at a time, a word at the forefront of the field of view having a larger size than a word at point farthest from the forefront of the field of view.

4. The method of claim 3, comprising:
   repetitively presenting the three-dimensional word object on the display as the three-dimensional word object is moved out of the field of view of the display; and
   decreasing a size of each presentation of the three-dimensional word object as the three-dimensional word object is moved out of the field of view of the display.

5. The method of claim 4, comprising:
   intertwining elements of each repeated three-dimensional word object with an immediately preceding three-dimensional word object.

6. The method of claim 1, comprising adjusting the eyesight fixation point to appear in a field of vision of a user, the field of vision being determined from a user profile.

7. The method of claim 1, wherein the three-dimensional word object comprises one or more of fonts, letters, signs and symbols associated with multi-dimensional reading.

8. The method of claim 1, wherein presenting the word on the display comprises one or more of:
   presenting the word on a display of a mobile phone;
   presenting the word on a display of a television set;
   presenting the word on a display of a monitor device;
   presenting the word on a display of a billboard;
   presenting the word on a display of a traffic sign; or presenting the word on a display of a large roadside sign.

9. The method of claim 1, comprising controlling a speed of moving the three-dimensional word object into the field of the view of the display using a control button, a joystick associated with the display.

10. The method of claim 1, wherein the display is associated with a reading perception game.

11. The method of claim 1, wherein the display is associated with an e-learning device.

* * * * *